(12) United States Patent
Howard et al.

(10) Patent No.: US 7,525,041 B2
(45) Date of Patent: Apr. 28, 2009

(54) METHOD AND APPARATUS FOR RESONANCE FREQUENCY RESPONSE ATTENUATION

(75) Inventors: David Clarence Howard, Cincinnati, OH (US); Edward Michael O'Neil, Glendale, OH (US); Patrick John Valko, Brownsburg, IN (US)

(73) Assignee: General Electric Company, Schemectady, NY (US)

( * ) Notice: Subject to any disclaimer, the term of this patent is extended or adjusted under 35 U.S.C. 154(b) by 259 days.

(21) Appl. No.: 11/524,582

(22) Filed: Sep. 21, 2006

(65) Prior Publication Data

US 2008/0073099 A1    Mar. 27, 2008

(51) Int. Cl.
*H01B 7/00* (2006.01)

(52) U.S. Cl. .................................................. 174/28

(58) Field of Classification Search .................. 174/36, 174/102 R, 102 P, 110 R, 110 A, 28, 29
See application file for complete search history.

(56) References Cited

U.S. PATENT DOCUMENTS

| | | | | |
|---|---|---|---|---|
| 2,348,752 A | * | 5/1944 | Quayle | 174/27 |
| 2,381,003 A | * | 8/1945 | Ryan | 174/29 |
| 2,614,172 A | * | 10/1952 | Greenfield et al. | 178/45 |
| 2,879,318 A | * | 3/1959 | Straube | 174/36 |
| 4,018,977 A | * | 4/1977 | Herrmann et al. | 174/24 |
| 4,409,816 A | | 10/1983 | Yamaguchi et al. | |
| 4,987,274 A | * | 1/1991 | Miller et al. | 174/102 R |
| 5,065,869 A | | 11/1991 | Doi et al. | |
| 5,262,593 A | * | 11/1993 | Madry et al. | 174/102 R |
| 5,286,923 A | * | 2/1994 | Prudhon et al. | 174/113 R |
| 5,740,198 A | * | 4/1998 | Ham | 375/257 |
| 5,829,485 A | | 11/1998 | Fatato et al. | |
| 5,927,699 A | | 7/1999 | Nakajima et al. | |
| 6,289,735 B1 | | 9/2001 | Dister et al. | |
| 6,346,671 B1 | * | 2/2002 | Ahrens et al. | 174/28 |
| 6,449,565 B1 | | 9/2002 | Budrow et al. | |
| 7,013,210 B2 | | 3/2006 | McBrien et al. | |
| 7,054,748 B2 | | 5/2006 | Gelsomino | |
| 7,197,430 B2 | | 3/2007 | Jacques et al. | |
| 2002/0079128 A1 | * | 6/2002 | Karrmann | 174/113 AS |
| 2007/0027607 A1 | | 2/2007 | Norris et al. | |
| 2007/0043497 A1 | | 2/2007 | Leogrande et al. | |

FOREIGN PATENT DOCUMENTS

GB          2347984 A          9/2000

OTHER PUBLICATIONS

Search Report, App. No. GB0717872.6 (Nov. 28, 2007).

* cited by examiner

*Primary Examiner*—William H Mayo, III
(74) *Attorney, Agent, or Firm*—William Scott Andes, Esq.; Armstrong Teasdale LLP

(57) ABSTRACT

A method for attenuating resonance frequency responses includes encasing at least one conducting element within a protective sheath and disposing a damping element about the at least one conducting element. The damping element is fixedly secured to the at least one conducting element for inhibiting relative movement between the damping element and the conduit. The method also includes positioning the at least one conducting element concentrically within a conduit to define a gap between the at least one conducting element and the conduit.

20 Claims, 8 Drawing Sheets

METHOD AND APPARATUS FOR RESONANCE FREQUENCY RESPONSE ATTENUATION

BACKGROUND OF THE INVENTION

This invention relates generally to vibratory environments, and more particularly, to methods and apparatus for resonance frequency response attenuation.

Resonance frequency activity of cables is determined by the mass and stiffness of the cable and cable/clamp support system. Resonance frequency response activity, of cables in phase and amplitude with engine imbalance forces, is dependent on phase and amplitude of the forcing function and may lead to early failure if the forcing function coincides with the modal response of the cables. Electrical conductors and cables, as installed on engines, require effective damping and support constraint to survive the high level vibratory environment in these applications.

Electrical cables are bundled and shrouded with flexible conduits allowing routing to accommodate pre-existing cable clamp/bracket locations, and have low bending rigidity. The damping characteristics must be effective over broadband frequency and thermal ranges to control mechanically induced vibratory excitation. Electrical cable routing configurations are generally tuned to be quiescent by application specific means and the vibration stability of each application is verified individually by testing, monitoring and trending. The free span clamp lengths are defined to control vibration frequency response acceptable levels. Solutions to these issues require extensive data characterization, are reactive in nature and require extensive resources to resolve.

Electrical cables and cable-like sensors, such as TNACs, are made of an inner conducting wire and an outer protective jacket. The TNAC outer protective jacket is made of Nickel-200 and flexes repeatedly due to vibratory excitation of a gas turbine engine. As the outer protective jacket repeatedly flexes, it work-hardens, becomes brittle and breaks. When the Nickel-200 outer jacket breaks the inner sensor wire is directly exposed to the harsh operating environment of the gas turbine engine and is quickly damaged.

Gas turbine engine components like the TNAC are required to satisfy on-wing life expectancy requirements by functioning for up to fifty thousand operating hours without failure. However, the average on-wing life for the TNAC is only three thousand operating hours. Consequently, the TNAC fails to meet on-wing life expectancy requirements. To avoid damaging the entire sensor and at the same time satisfy on-wing expectancy requirements, the inner sensor wire must be immobilized and protected from the outside environment. The environment includes the vibratory and temperature conditions of the engine and other miscellaneous loads such as tools hung on the outer protective jacket by maintenance workers.

Consequently, there is needed an improved damping system effective over a wide range of frequencies and applications specific to a temperature range that attenuates all vibratory activity without the need to tune to a specific frequency.

BRIEF DESCRIPTION OF THE INVENTION

In one exemplary embodiment, a method for attenuating resonance frequency responses is disclosed. The method includes encasing at least one conducting element within a protective sheath and disposing a damping element about the at least one conducting element. The damping element is fixedly secured to the at least one conducting element for inhibiting relative movement between the conducting element and a conduit. The method also includes positioning the at least one conducting element concentrically within the conduit to define a gap between the at least one conducting element and the conduit.

In another exemplary embodiment a resonance frequency response attenuation apparatus is disclosed. The apparatus includes a conduit, at least one conducting element encased in a protective sheath and a damping element disposed about the at least one conducting element. The damping element is fixedly secured to the at least one conducting element for inhibiting relative movement between the conducting element and the conduit, and the at least one conducting element is disposed concentrically within the conduit and defines a gap between the conduit and the at least one conducting element.

DETAILED DESCRIPTION OF THE INVENTION

Figure 1:
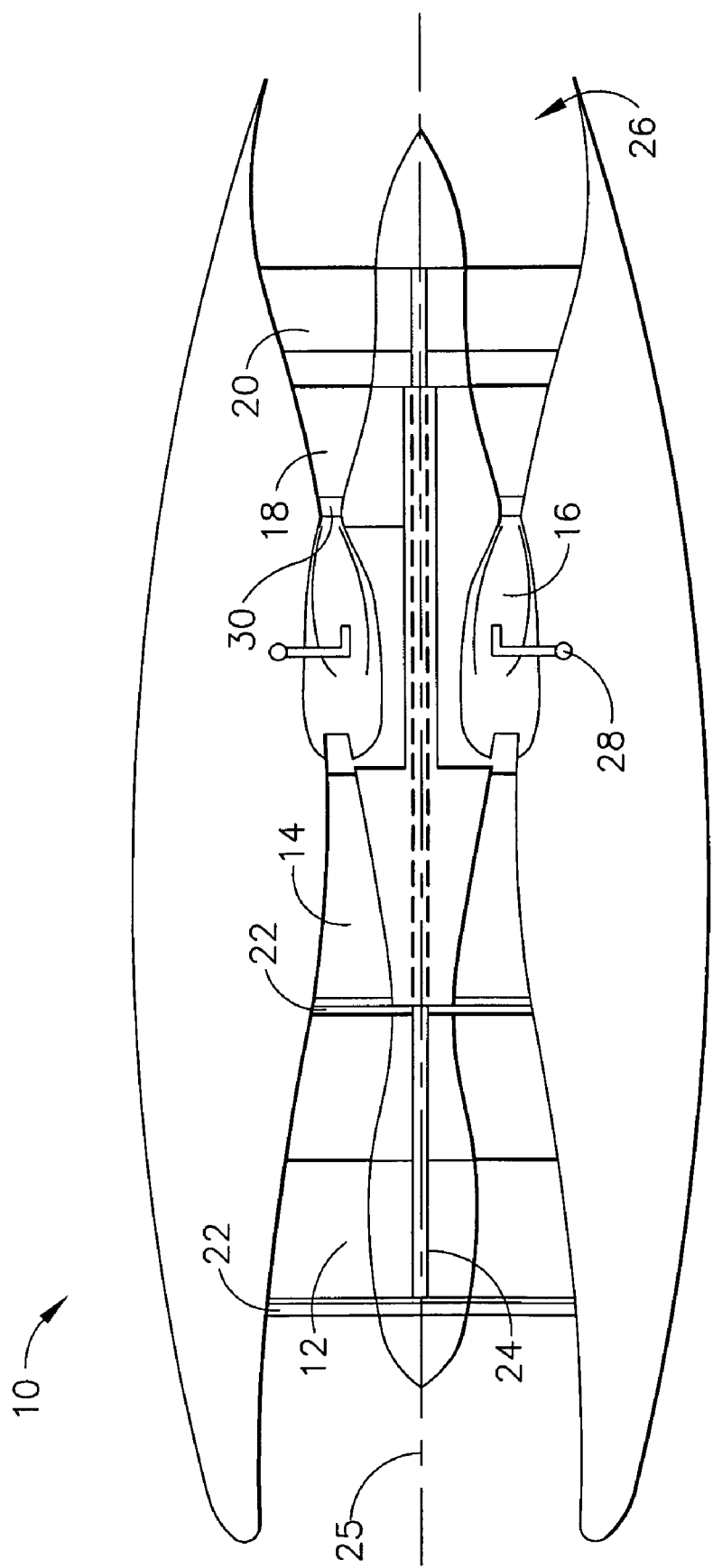
FIG. 1 is a schematic diagram of a gas turbine engine.

FIG. 1 shows a schematic illustration of a gas turbine engine 10 including a low pressure compressor 12, a high pressure compressor 14 and a combustor 16. The gas turbine engine 10 also includes a high pressure turbine 18, a low pressure turbine 20 and a turbine nozzle assembly 30.

In operation, air flows through low pressure compressor 12 and then compressed air is supplied from low pressure compressor 12 to high pressure compressor 14. Each of the low pressure compressor 12 and the high pressure compressor 14 includes variable stator vanes 22 that control the incidence angle of the air as it enters the compressors 12, 14, allowing the gas turbine engine 10 to operate more efficiently. A conventional fuel system 28 provides fuel that is combined with high pressure air and burned in the combustor 16. The resulting high temperature combustion gases are delivered from the combustor 16 to the turbine nozzle assembly 30. Airflow (not shown in FIG. 1) from the combustor 16 drives the high pressure turbine 18 and the low pressure turbine 20.

Figure 2:
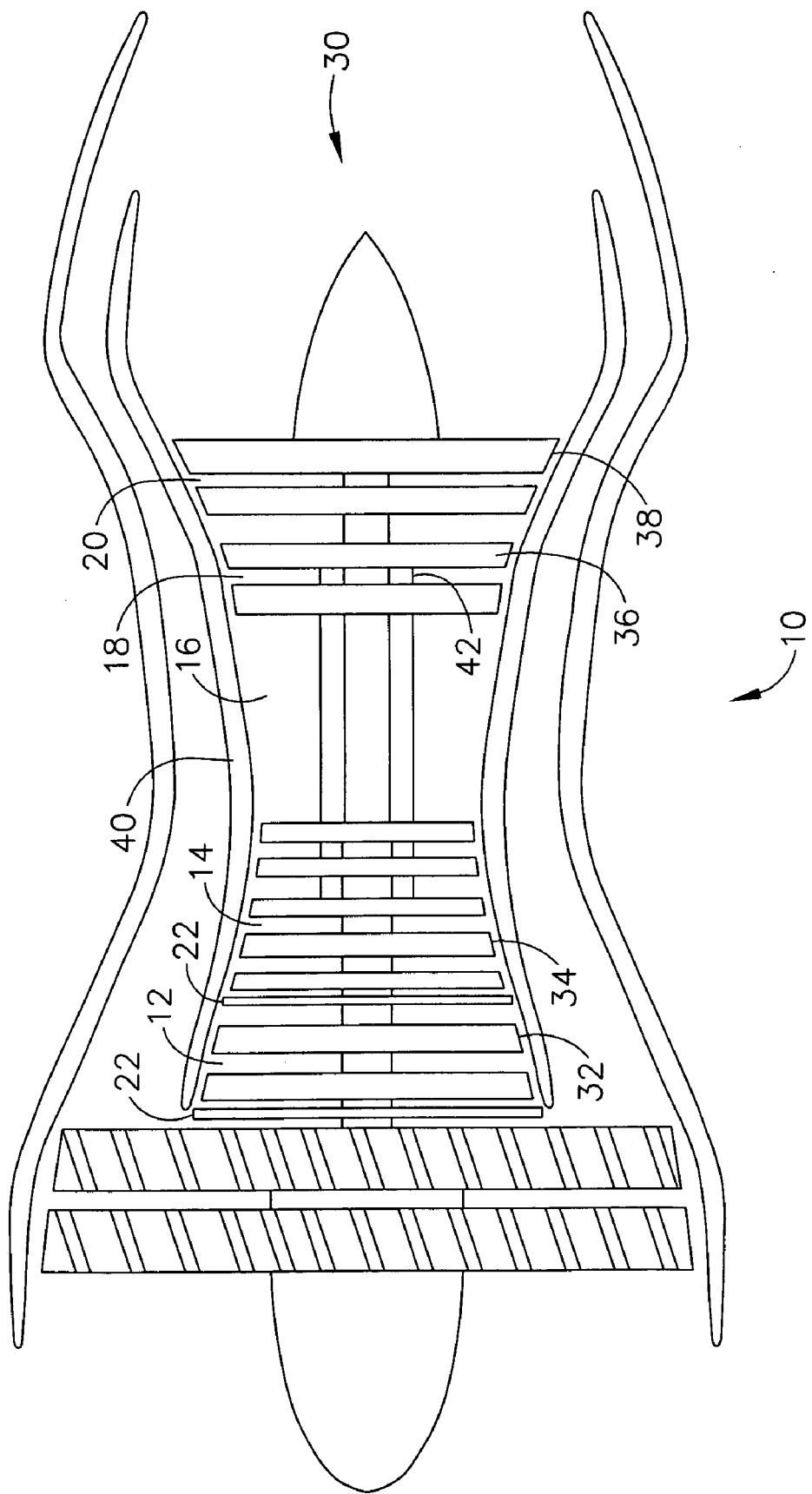
FIG. 2 is a schematic cross sectional view of a gas turbine engine.

FIG. 2 illustrates a cross sectional view of the gas turbine engine 10 of FIG. 1. The low pressure compressor 12, high pressure compressor 14, high pressure turbine 18 and low pressure turbine 20, each includes a rotor assembly. A rotor assembly, for example turbine 18, includes a set of rotor blades 36, wherein each rotor blade 36 is coupled to a rotor disk (not shown in FIG. 2) that is rotatably coupled to a rotor shaft 42, such that blades 36 are spaced about a circumference of the rotor disk. A plurality of circumferentially-spaced rotor blades 32, 34, 36, 38 is generally referred to as a bucket. During gas turbine engine 10 operation the rotor assemblies induce mechanical and aerodynamic vibratory excitation in the gas turbine engine 10 structure.

Mechanical vibratory excitation is induced in the gas turbine engine 10 by the rotor assemblies of the compressors 12, 14 and of the turbines 18, 20. During gas turbine engine 10 operation, the rotor assemblies experience imbalance during rotation, thus imparting mechanical vibratory excitation to the stationary members of the gas turbine engine 10. The primary rotor assembly imbalance occurs at one per revolution of the machine. Foreign object damage also causes mechanical vibratory excitation. During operation, the gas turbine engine 10 may ingest some type of foreign object or debris, such as ice, birds and mechanics tools from the runway. Depending on the size of the ingested object or debris, a rotor blade 32, 34, 36, 38 may break off causing further rotor assembly and rotor blade imbalance. Additionally, the rotor blades 32, 34, 36, 38 generate further vibratory excitation through harmonics that develop at multiples of one per revolution.

Aerodynamic vibratory excitation is developed by the passing frequency of the rotor blades 32, 34, 36, 38. As the rotor blades 32, 34, 36, 38 pass stationary members of the gas turbine engine 10 aerodynamic forces are generated. These aerodynamic forces create vibratory signatures on stationary members of the engine 10, such as the nozzle assembly 30, and are then transmitted throughout the gas turbine engine casing 40.

Figure 3:
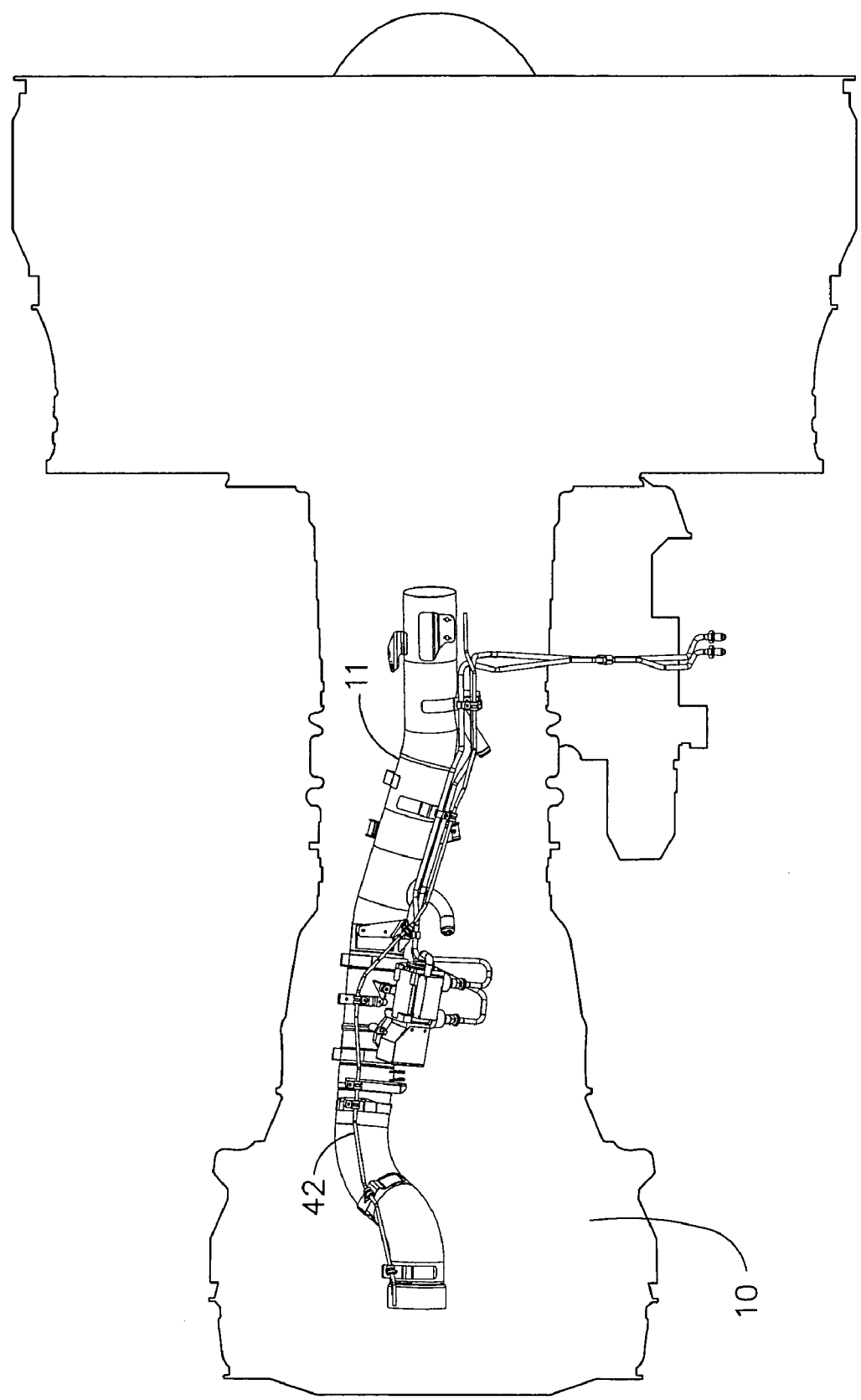
FIG. 3 illustrates a gas turbine engine with a duct mounted thereon and a conducting element mounted on the duct.

FIG. 3 shows a conducting element 42 mounted on a gas turbine engine duct 11. In one exemplary embodiment the conducting element 42 may be a resistance temperature detector, also known as an RTD. However, it should be appreciated that, in other various exemplary embodiments, the conducting element 42 may be any type of conducting element and is not limited to being an RTD. Conducting elements 42, such as the RTD, in high temperature applications are protected by metallic sheaths that control internal cable temperature to acceptable limits. High temperature applications apply to maximum temperatures greater than five hundred degrees Fahrenheit (260 degrees Celsius). The conducting elements 42 are routed in three dimensional space to conform to the external gas turbine engine 10 configuration. The conducting element 42 routing includes straight segments interconnected by intersection bend radii, simple bends and terminations.

Figure 4:
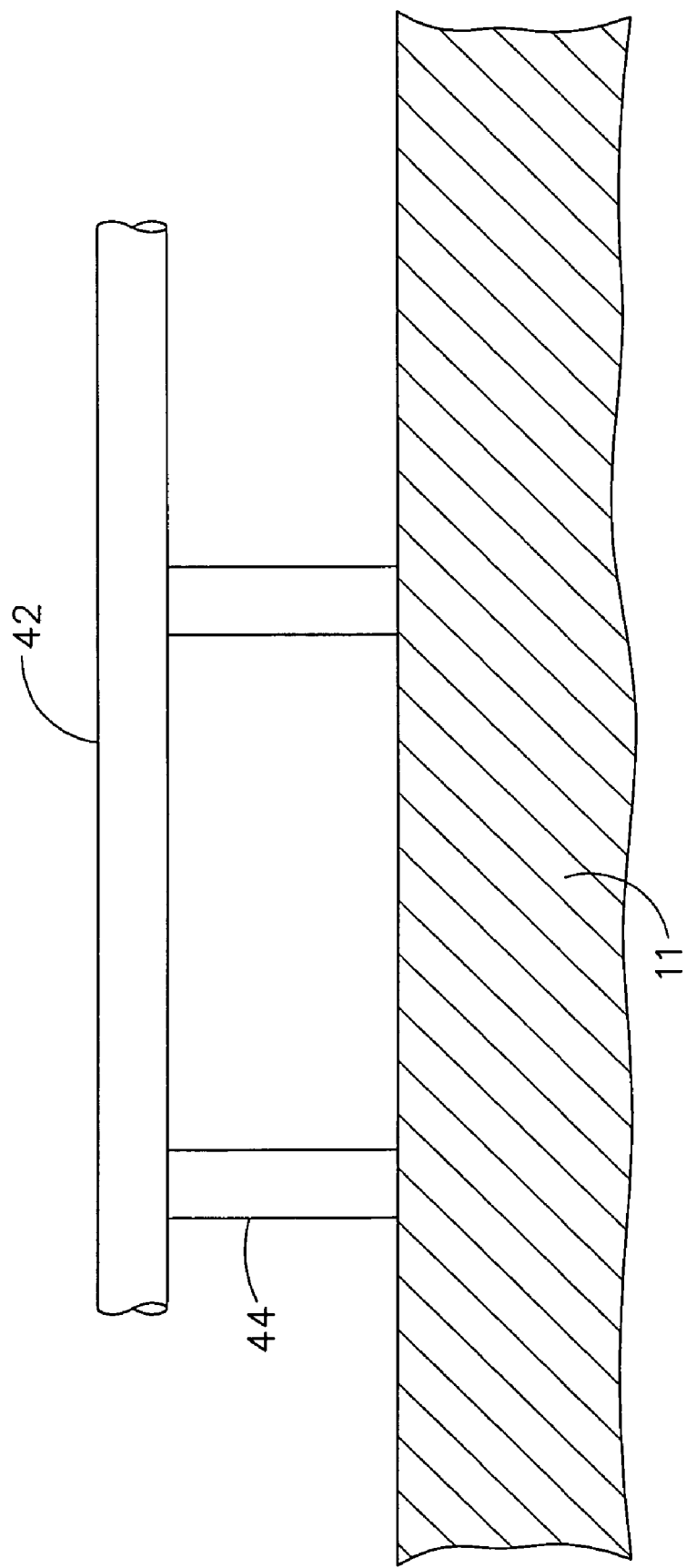
FIG. 4 illustrates a blown-up view of the mounting structure used for attaching the conducting element to the engine duct of FIG. 3.

In the exemplary embodiment, the conducting element 42 may be a specific type of RTD called an area averaging resistance temperature detector. FIG. 4 shows the TNAC mounted on a gas turbine engine duct 11 using a series of small clamps 44.

Figure 5:
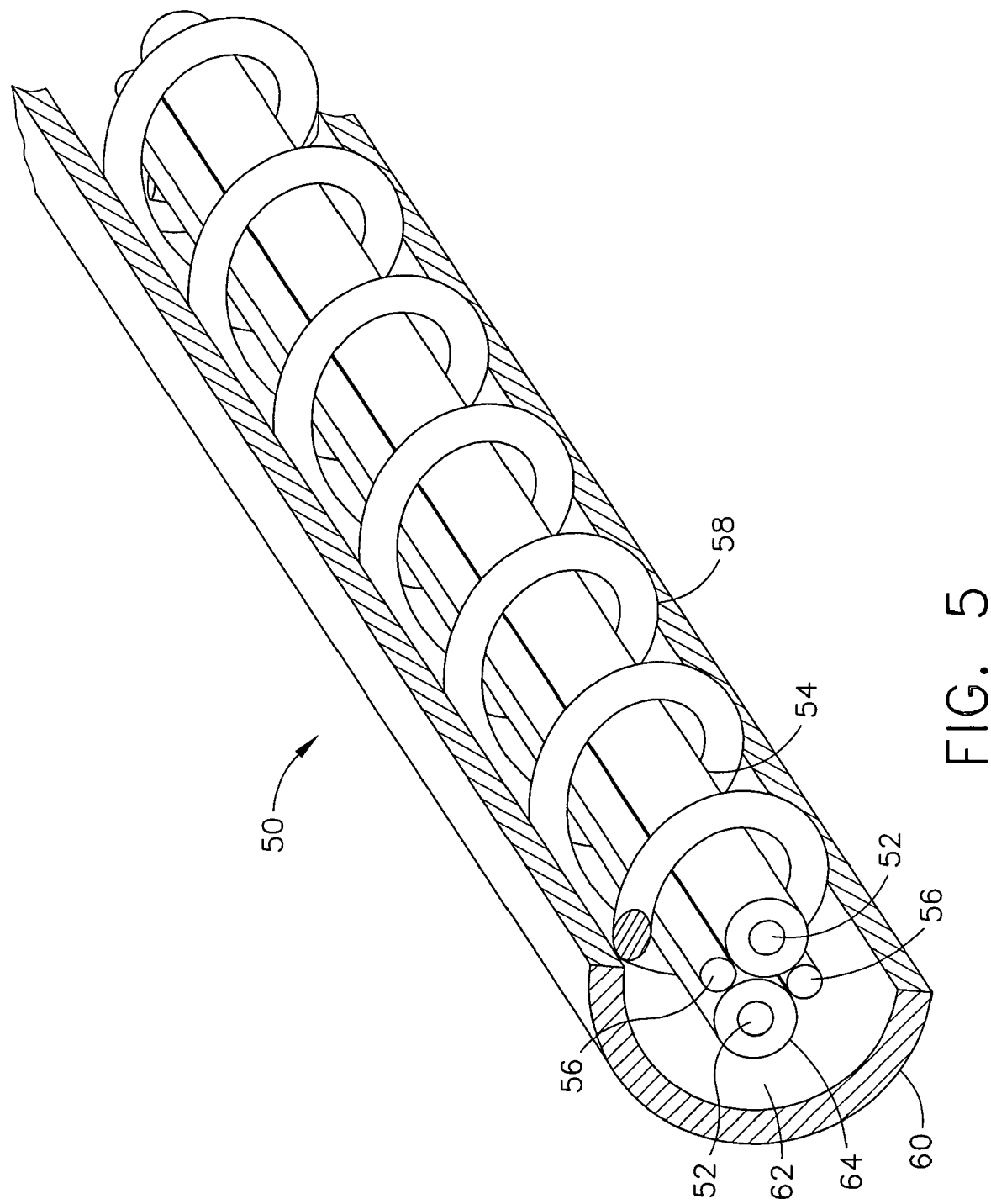
FIG. 5 illustrates an exemplary embodiment of a resonance frequency response attenuation apparatus.

FIG. 5 shows a perspective view of a cable 50. In the exemplary embodiment the cable 50 has a vibration damping element designed to attenuate all engine vibratory activity without the need to tune to a specific frequency. In the exemplary embodiment the cable 50 includes two conducting elements, or sensor elements 52, made from platinum encased within a Nickel-200 sheath 54 and is disposed within an external conduit 60. The overall conductor is 0.118 inches (0.3 cm) wide, 0.053 inches (0.13 cm) high and 57.60 inches (146 cm) long. It should be appreciated that the sensing elements 52 may have any cross sectional shape.

The external conduit 60 is made from inconel, a nickel-ferrous alloy, has a circular cross sectional area and extends for the full length of the sensing elements 52. Additionally, the external conduit 60 has an inner surface defined by an inside diameter and an outer surface defined by an outside diameter. In the exemplary embodiment, the inside diameter of the conduit 60 is 0.18 inches (0.46 cm). It should be appreciated that the external conduit 60 may be made from other materials suitable for other applications and their respective operating environments. Consequently, in other various exemplary embodiments the external conduit may be made from material such as, but not limited to, stainless steel, aluminum, and PVC. It should also be appreciated that the inside and outside diameters of external conduit 60, and corresponding cross sectional areas, may be any size so long as the inside diameter is less than the outside diameter. However, the size of the external conduit 60 outside diameter may be limited due to the space available in the gas turbine engine 10. Further, it should be appreciated that although in the exemplary embodiment the external conduit 60 has a circular cross section, the external conduit 60 may have any cross sectional shape.

The sensing elements 52 are sensitive to the harsh operating environment of gas turbine engines 10, so a protective sheath 54 is disposed about each sensing element 52, effectively encasing the sensing element 52 within the protective sheath 54. To further protect the sensing elements 52, wherein each sensing element 52 is encased within a respective protecting sheath, the sensing elements 52 are concentrically positioned within the external conduit 60 to define a gap 62 between the outside surface of the protective sheaths 54 and the inside surface of the external conduit 60. In the exemplary embodiment, the gap 62 is between 0.0025 inches (0.0064 cm) and 0.0065 inches (0.1651 cm). The gap 62 preferably has a constant width and extends for the full length of the sensing element 52. It should be appreciated that the number of sensing elements 52 is not limited to two elements 52 and that any number of sensing elements 52 may be used. However, the number of sensing elements 52 may be limited by the size of the inside diameter of the external conduit 60. It should be further appreciated that the width of gap 62 may vary depending on the inside diameter of the external conduit 60 and the number of sensing elements 52 disposed within the conduit 60.

FIG. 5 also shows the spacer wires 56 disposed between the protective sheaths 54. The spacer wires 56 are made from the same material as the protective sheath 54, Nickel-200, and have an outside diameter of 0.0285 inches (0.072 cm). It should be appreciated that the spacer wires 56 may be made from other materials so long as the material does not damage the other components, including the damper wires 58 (discussed below) and the external conduit 60. The spacer wires 56 facilitate filling the gap 62 between the outside surface of the protective sheaths 54 and the inner surface of the external conduit 60, thus creating a more circular cross sectional shape to meet the inner cross sectional shape of the external conduit 60. It should be appreciated that as the number of sensing elements increases, fewer spacer wires 56 are needed to meet the inner cross sectional shape of the external conduit 60.

The sensing elements 52 encased in protective sheaths 54 and being separated by the spacer wires 56 form a composite structure 64. A vibration damping element, such as the damper wire 58, is disposed about the composite structure 64 and is in firm contact with the inside surface of the external conduit, thus concentrically positioning and damping vibrations of the sensing elements 52. The damper wire 58 has a circular cross section, has an outside diameter of 0.0285 inches (0.072 cm) and is disposed within the external conduit 60 and within the gap 62 between the outside surface of the protective sheath 54 and the inner surface of the external conduit 60. Additionally, the damper wire 58 is wound helically about the composite structure 64 and circumscribes the composite structure 64. Further, the damper wire 58 may be brazed to the protective sheaths 54 of the composite structure 64 to constrain any relative movement, due to relative thermal growth, vibration or other effects, between the damper wire 58 and the protective sheath 54. Doing so prevents the damper wire 58 from chafing the protective sheath 54 and possibly shorting the sensing element 52 to ground. The damper wire 58 is made from Nickel-200 or a nickel material derivative characterized as a softer material and should be no harder than the protective sheath 54 material. It should be appreciated that the damper wire 58 may be made from other materials suitable to other applications and their respective operating environments. Consequently, in other various exemplary embodiments, the damper wires 58 may be made from materials such as, but not limited to, nickel, rubber, copper, steel, and a visco-elastic material. The damper wire 58 should be lightweight and economic.

Each gas turbine engine 10 generates different vibratory excitations at different frequencies or sine functions, so the cable routing configurations are separately tuned. However, gas turbine engines 10 uniformly experience different operating vibratory excitation frequencies corresponding to different stages of operation. For example, gas turbine engines 10 have a warming-up stage with a corresponding frequency of about 60 Hz and a constant continuous flying stage with a corresponding frequency of about 180 Hz. In the exemplary embodiment, the resonance frequency response of the sensing element 52 is controlled, or tuned, by adjusting the helical pitch spacing of the damper wires 58, adjusting the width of the gap 62 and adjusting the number of damper wires 58.

Disposing the damper wire 58 to circumscribe the composite structure 64 in a helical pattern facilitates tuning the sensing element 52. Specifically, the helical pitch spacing of the damper wires 58 controls the resonance frequency of the sensing element 52. Thus, decreasing helical pitch spacing increases the resonance frequency of the sensing element 52. By the same token, increasing the helical pitch spacing decreases the resonance frequency of the sensing element 52. The helical pitch spacing is designed to control the constant continuous flying stage resonance frequency response at about 180 Hz for gas turbine engines 10, thus eliminating the need for tuning to a specific frequency. In the exemplary embodiment, the helical pitch spacing of the damper wires 58 is 6.25 inches (15.88 cm).

Providing the gap 62 in the exemplary embodiment additionally controls the resonance frequency response of the sensing element 52. The resonance frequency response is further controlled, or the sensing element 52 is further tuned, by adjusting the width of the gap 62 between the outside surface of the protective sheaths 54 and the inner surface of the external conduit 60. Decreasing the gap 62 width increases the resonance frequency response of the sensing element 52. Increasing the gap 62 width decreases the resonance frequency response of the sensing element 52.

In the exemplary embodiment, the resonance frequency response of the sensing element 52 is also controlled by the number of damper wires 58 disposed about the composite structure 64. Increasing the number of damper wires 58 decreases the resonance frequency response of the sensing elements 52. Decreasing the number of damper wires 58 increases the resonance frequency response of the sensing elements 52.

In the exemplary embodiment, the composite structure 64 is manufactured in a straight length configuration. The external conduit 60 has a circular cross section area and is also manufactured in straight length configurations. The composite structure 64, with damper wire 58, is inserted into the external conduit 60 before the assembled cable 50 is conformally routed throughout the engine 10. It should be appreciated that situating the composite structure 64 and the damper 58 within the external conduit 60 does not constitute a swaged fit. Because the damper wires 58 are in firm contact with the inside surface of the external conduit 60, the damper wires 58 also reinforce the external conduit 60.

It should be appreciated that although a single damper wire 58 is used in the exemplary embodiment, any number of damper wires 58 may circumscribe and be brazed to the composite structure 64 in a helical pattern. It should be further appreciated that vibration damping elements other than a damping wire 58 may be used and disposed in the gap 62.

Figure 6:
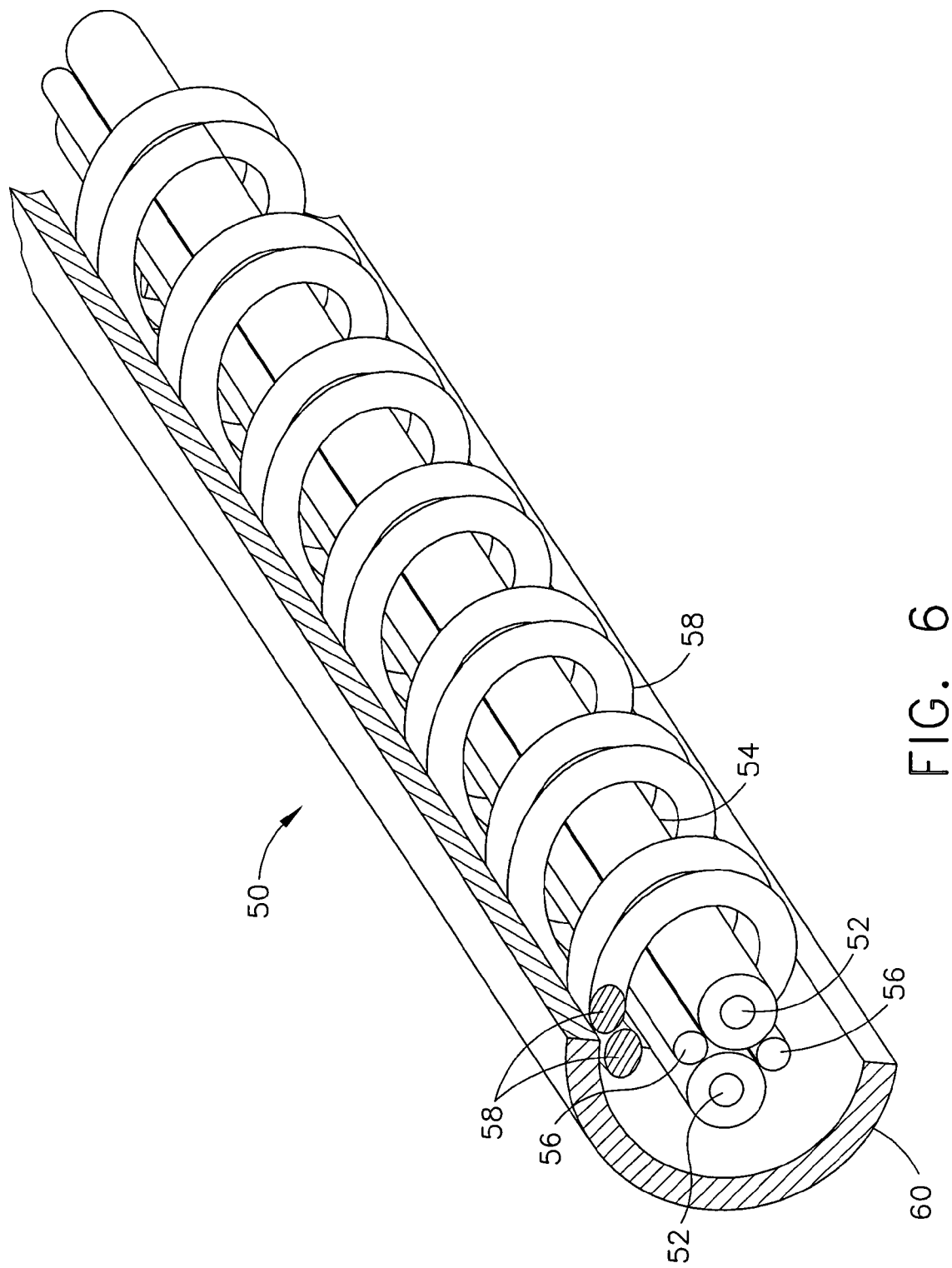
FIG. 6 illustrates another exemplary embodiment of a resonance frequency response attenuation apparatus.

FIG. 6 shows another exemplary embodiment wherein the vibration damping element includes two damper wires 58 disposed adjacent and parallel to each other. The two damper wires 58 are together helically wrapped about, circumscribe and are brazed to the composite structure 64. It should be appreciated that the damper wires 58 may also be brazed to each other and are to be disposed parallel to each other and not intersect. It should be further appreciated that although one or more damper wires 58 may be disposed in the gap 62 between the outer surface of the sheath 54 and the inner surface of the external conduit 60, other damping materials may be substituted for the damper wires 58 in the gap 62.

Figure 7:
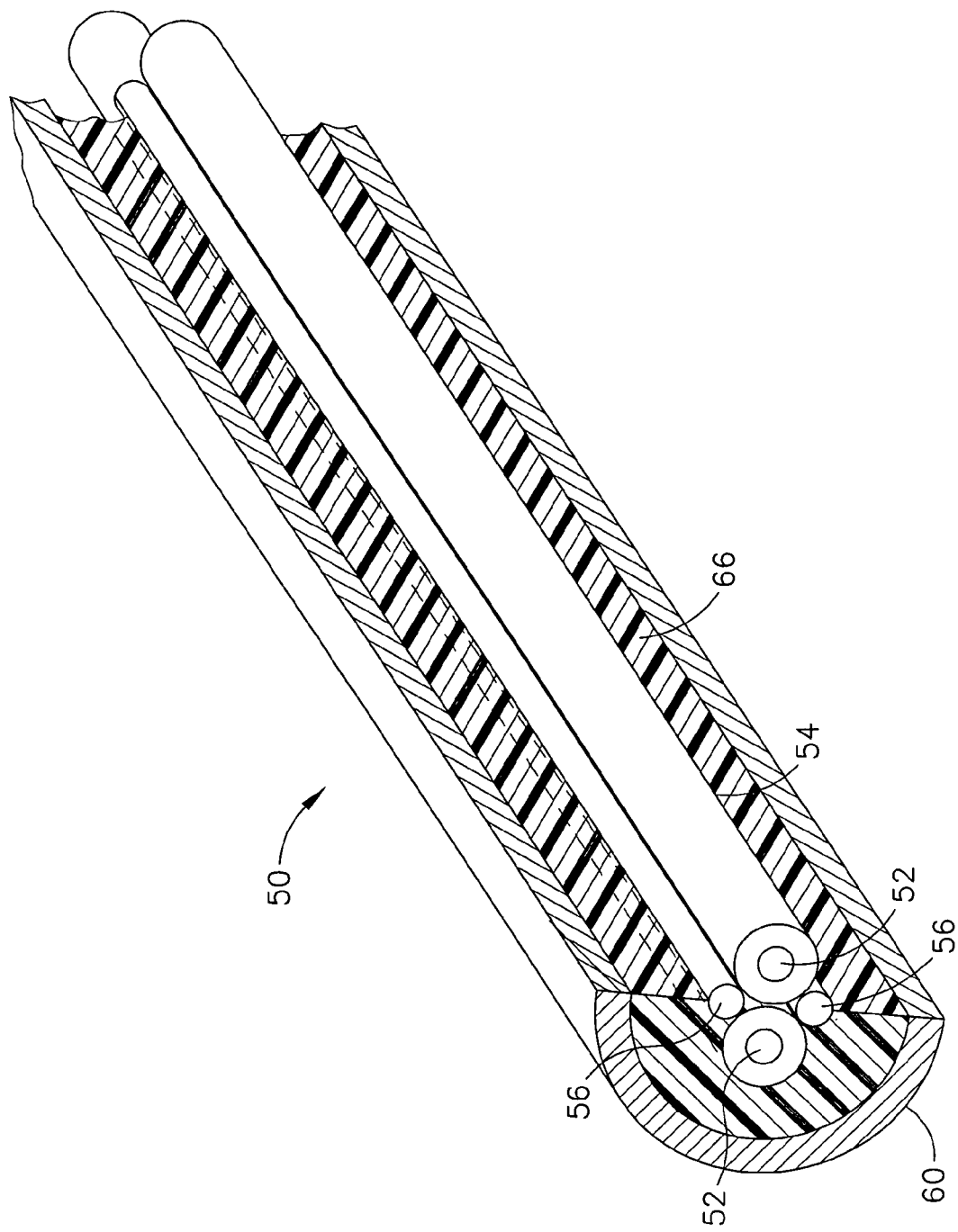
FIG. 7 illustrates yet another exemplary embodiment of a resonance frequency response attenuation apparatus.

FIG. 7 shows yet another exemplary embodiment wherein the vibration damping element includes an alternative visco-elastic material with thermal shrink properties, such as shrink tubing 66, and disposing it in the gap 62. Shrink tubing 66 is a Teflon type material which is disposed about the composite structure 64 such that the Teflon material shrinks in size upon heating. As the shrink tubing material 66 is heated it shrinks in size, compressing the composite structure 64, and it becomes possible to slip the composite structure 64 with the shrink tubing 66 into the external conduit 60. The shrink tubing material 66 immobilizes the composite structure 64 within the external conduit 60. However, the shrink tubing material 66 may provide less structural support or reinforcement to the external conduit 60 because it is not as stiff as the damper wire 58 disposed in a helical configuration about composite structure 64. Shrink tubing 66 is used in low temperature applications where the maximum temperature is less than three hundred degrees Fahrenheit (149 degrees Celsius).

Figure 8:
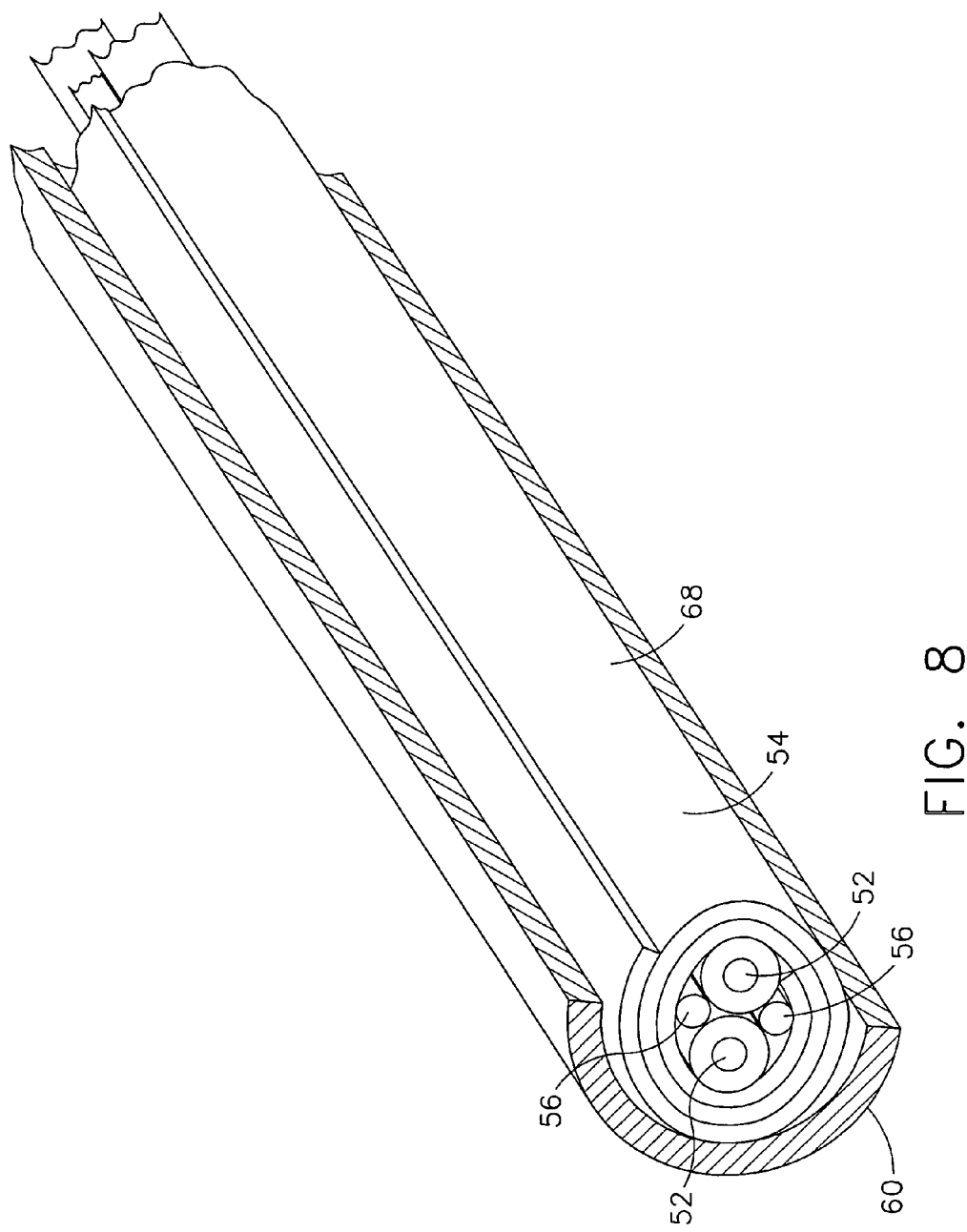
FIG. 8 illustrates yet another exemplary embodiment of a resonance frequency response attenuation apparatus.

FIG. 8 shows yet another exemplary embodiment wherein the vibration damping element includes a wire mesh material 68 disposed in the gap 62. The wire mesh 68 is wrapped around the composite structure 64 so that the wire mesh 68 circumscribes the composite structure 64 at least one time. The wire mesh 68 is brazed to the composite structure 64. Further, it should be appreciated that in other various exemplary embodiments where the wire mesh 68 circumscribes the composite structure 64 a plurality of times, a plurality of layers of the wire mesh 68 are disposed about and circumscribe the composite structure 64. These layers of wire mesh 68 may also be brazed to each other. The wire mesh 68 acts as a damper as well as tolerates a wide range of extreme vibration frequencies and temperatures. However, the wire mesh material 68 provides less structural support or reinforcement to the external conduit 60.

In the exemplary embodiment, the vibration damping element effectively controls adverse vibration responses through friction damping over a wide forcing frequency range and a wide temperature range. The frequency range is generally from about 30 Hertz to about 3 Kilohertz and corresponds to passing frequencies of compressor rotor blades 32, 34 and turbine rotor blades 36, 38. This frequency range contains an ensemble of pure tone, random and harmonic-forcing frequencies. The temperature range extends from a minimum of minus forty degrees Fahrenheit (−40 degrees Celsius) to seven hundred fifty degrees Fahrenheit (399 degrees Celsius).

The exemplary embodiment of the vibration damping element described herein is designed to attenuate all vibratory activity, without the need to tune to a specific frequency. In the exemplary embodiment, the vibration damping element controls adverse vibration by dissipation of friction energy induced by resonance and relative movement between the internal sensing element 52 and the external conduit 60. Additionally, the vibration damping element flexibility allows the combined conducting, or sensing element 52, vibration damping element and external conduit 60 to be assembled while in an un-bent straight condition and then formed to meet configuration routing requirements. Furthermore, the vibration damping element provides thermal protection in high temperature applications while maintaining thermal conductivity and transient response to the external conduit 60 member into the internal temperature sensing element 52. In addition, the vibration damping element provides vibration protection for sensitive electrical circuit elements when exposed to high energy acoustic or mechanical vibratory inputs at elevated temperatures.

It should be appreciated that various other exemplary embodiments may be used with any conducting element requiring protection from elevated external temperatures or excessive mechanical vibration, or both. The various other exemplary embodiments may be applied in any environment that vibrates, such as, but not limited to, lawnmower engines, motor boat engines, and cruise line ship engines.

While the invention has been described with reference to a specific embodiment, the description of the specific embodiment is illustrative only and is not to be construed as limiting the scope of the invention. Various other modifications and changes may occur to those skilled in the art without departing from the spirit and scope of the invention.

What is claimed is:

1. A method for attenuating resonance frequency responses, comprising:
    encasing at least one conducting element within a protective sheath;
    disposing a damping element about the at least one conducting element, wherein the damping element is fixedly secured to the at least one conducting element for inhibiting relative movement between the conducting element and a conduit;
    applying at least one spacing wire longitudinally adjacent to at least a pair of the plurality of conducting elements; and
    positioning the at least one conducting element concentrically within the conduit to define a gap between the at least one conducting element and the conduit.

2. The method in accordance with claim 1, further comprising:
    disposing a plurality of conducting elements concentrically within the conduit.

3. The method in accordance with claim 2, wherein the damper element comprises a visco-elastic material, the method further comprising applying the visco-elastic material about the plurality of conducting elements each encased in a protective sheath and about the plurality of spacing wires.

4. The method in accordance with claim 1, further comprising positioning the damping element helically about and circumscribing the at least one conducting element, wherein the damping element contacts an inner surface of the conduit.

5. The method in accordance with claim 1, wherein the damping element is made from material selected from the group consisting of, nickel, rubber, copper, steel and visco-elastic material.

6. The method in accordance with claim 1, further comprising positioning at least one other damping element adjacent the damping element, the damping element and the at least one other damping element being disposed helically about and circumscribing the at least one conducting element, wherein the at least one other damping element is fixedly secured to the at least one conducting element for preventing relative movement between the at least one other damping element and the conducting element, and for tuning the resonance frequency response of the conducting element.

7. The method in accordance with claim 1, further comprising varying a pitch spacing of the damping element for tuning the resonance frequency response of the conducting element.

8. The method in accordance with claim 1, further comprising varying the gap width to facilitate tuning of the resonance frequency response of the conducting element.

9. The method in accordance with claim 1, wherein the damper element further comprises a wire mesh material.

10. The method in accordance with claim 9 wherein the wire mesh material circumscribes the at least one conducting element encased in a protective sheath to form a plurality of wire mesh layers circumscribing the at least one conducting element encased in the protective sheath, and wherein the wire mesh material is brazed to the protective sheath and each of the plurality of wire mesh layers is brazed to another of the plurality of the wire mesh layers.

11. The method in accordance with claim 1 further comprising brazing the damping element to the protective sheath encasing the at least one conducting element.

12. A resonance frequency response attenuation apparatus, comprising:
    a conduit;
    at least one conducting element encased in a protective sheath;
    at least one spacing wire longitudinally positioned adjacent to at least a pair of the plurality of conducting elements; and
    a damping element disposed about the at least one conducting element, wherein the damping element is fixedly secured to the at least one conducting element for inhibiting relative movement between the conducting element and a conduit, and wherein the at least one conducting element is disposed concentrically within the conduit and defines a gap between the conduit and the at least one conducting element.

13. The apparatus in accordance with claim 12, further comprising:
    a plurality of conducting elements disposed concentrically within the conduit.

14. The apparatus in accordance with claim 13, wherein the damping element comprises a visco-elastic material disposed about the plurality of conducting elements each encased within the protective sheath and about the plurality of spacing wires.

15. The apparatus in accordance with claim 12, wherein the damping element is disposed helically about the at least one conducting element and is in contact with an inner surface of the conduit.

16. The apparatus in accordance with claim 12, wherein the damping element is made from material selected from the group consisting of nickel, rubber, copper, steel and visco-elastic material.

17. The apparatus in accordance with claim 12, further comprising at least one other damping element disposed adjacent and parallel to the damping element and the at least one other damping element being disposed helically about and circumscribing the at least one conducting element, wherein the at least one other damping element is fixedly secured to the at least one conducting element for preventing relative movement between the at least one other damping element and the conducting element, and for tuning the resonance frequency response of the at least one conducting element.

18. The apparatus in accordance with claim 12, wherein the damping element has a variable pitch spacing for tuning the resonance frequency response of the conducting element.

19. The apparatus in accordance with claim 12, wherein the gap width is variable to facilitate tuning of the resonance frequency response of the conducting element.

20. The apparatus in accordance with claim 12, wherein the damper element comprises a wire mesh material.

* * * * *